Dec. 31, 1968  F. SEEGER  3,418,767
WALL STRUCTURE WITH EXPELLABLE INSERT
Filed March 22, 1966
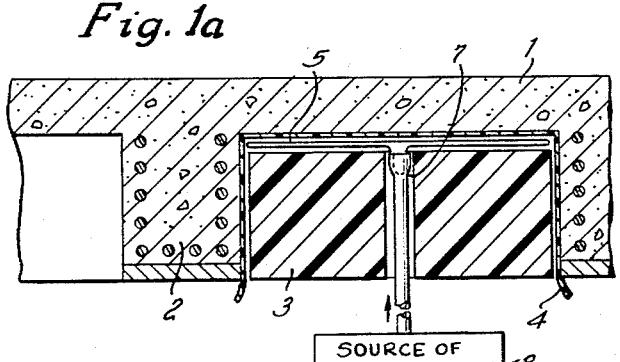
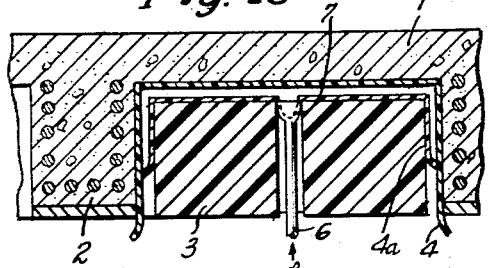
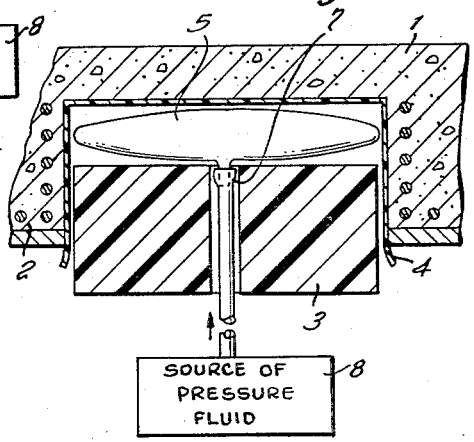
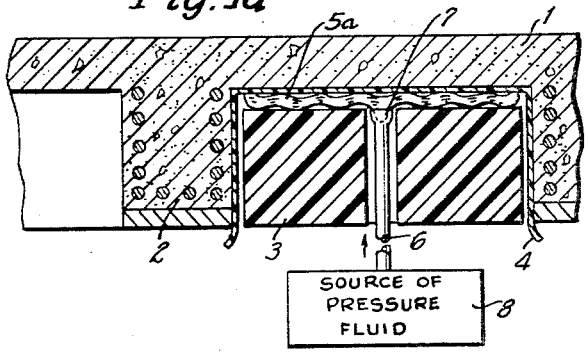
INVENTOR
*Fritz Seeger*
BY
*Michael J. Striker*
ATTORNEY United States Patent Office 3,418,767
Patented Dec. 31, 1968

1

3,418,767
WALL STRUCTURE WITH EXPELLABLE INSERT
Fritz Seeger, 1 Kirchstrasse, 7501 Blankenloch,
near Karlsruhe, Germany
Filed Mar. 22, 1966, Ser. No. 542,990
Claims priority, application Germany, Mar. 24, 1965,
S 96,163
8 Claims. (Cl. 52—127)

ABSTRACT OF THE DISCLOSURE

In the construction of a wall structure an insert of somewhat resilient foamed plastic material is positioned where a recess is to be provided. Hardenable material is poured about this insert so as to leave one side thereof free. Fluid is introduced between the juxtaposed inner surface of the insert and the bottom wall of the recess provided in the wall structure which is obtained when the hardenable material has hardened. The insert is thereby expelled, leaving a recess in the wall structure.

The present invention relates to a wall structure. More specifically, the invention relates to a wall structure in which an insert member is temporarily positioned in a predetermined location until hardening of a body of hardenable material which is molded about the insert, whereupon the latter is removed.

The invention also relates to a method of constructing such a wall structure.

Wall structures, such as ceilings and the like, frequently must be provided with recesses of various different configurations. In masonry structures this is accomplished simply by properly positioning the stones, bricks or blocks used for constructing the wall structure. In wall structures which are poured or otherwise molded from hardenable material this is much more difficult, however. If material of this type is to be used, the provision of forms or molds of a temporary nature is necessary and the construction of such forms is relatively expensive and also time-consuming.

To overcome this disadvantage and to make the position of variously configurated recesses in a wall structure of hardenable material simpler and more economical, it has been suggested to dispose insert members of a configuration corresponding to that desired for the recesses at such locations of the wall structure at which the recesses are desired. The hardenable material is then poured or otherwise molded about the inserts and, when the latter are removed after hardening of the hardenable material, a recess of the desired configuration remains.

An inexpensive and efficient way of constructing the inserts for this purpose is to make them of a foamable plastic material which is given the desired configuration. Besides being economical to manufacture, inserts of this type, which are usually relatively large, have the advantage of being very light and can therefore be readily moved about at the construction site.

Various ways for removing the insert from the finished wall structure are known. For instance, if total destruction of the insert is acceptable, the hardenable material, such as concrete, may be simply molded about the insert whereby the concrete adheres to the plastic material. After hardening of the concrete the plastic material is then simply broken out of the recess until it is completely removed. Naturally, this results in an increase in production costs since generally many such inserts are used and since each insert can serve only for the construction of one recess. It has also been proposed to provide an adhesion-preventing means, such as a coating of a lubricating material, or even a foil of plastic material, about those surfaces of the foam-plastic insert which will come in contact with the hardenable material during molding of the same. However, while such expedients facilitate removal of the insert from the completed wall structure in the sense that the concrete will not bond to the insert, there still exists the problem of physically withdrawing the insert from its recess. Such withdrawal can be accomplished in different ways, for example by introducing a sharp flat tool between opposing surfaces of the insert and of the completed wall structure and thus in effect "prying" the insert out of its recess. The fastening of a corkscrew-type tool in the foam-plastic insert has also been attempted, but has been unsuccessful since the strength of the plastic material is not such as to be able to retain the tool when pull is exerted thereon. In other words, the foam plastic breaks and the tool comes loose.

In other methods of removing the inserts it has been proposed to dispose plates of metallic material within the insert or overlying its inner face which will be opposite the bottom wall of the recess after construction of the wall structure. Screws or bolts can then be inserted through the insert and into the plates of metallic material and the inser can be withdrawn from the recess in this manner.

All of these proposed expedients suffer from various drawbacks. Specifically, they either result in destruction or at least damage to the insert, or they require relatively complicated construction and handling procedures and are thus, even if the insert can be removed undamaged, just as uneconomical as if the insert were in fact damaged beyond re-use.

It is therefore a general object of the present invention to provide a wall structure utilizing such inserts which will overcome the aforementioned disadvantages.

A more specific object of the present invention is to provide a wall structure of the type outlined above in which such inserts can be readily removed without the aid of mechanical means.

Still a more specific object of the present invention is to provide such a wall structure in which the inserts are removed hydraulically or pneumatically.

An additional object of the invention is to provide a method of constructing such a wall structure.

In accordance with one feature of my invention I provide, in a wall structure, the combination of a body of hardenable material, particularly concrete, which body has a side provided with at least one recess, and which recess is bounded by an inner surface, and an insert substantially filling the recess and having a surface adjacent the inner surface. I further provide expelling means for facilitating the expulsion of the insert from the recess.

Advantageously, the insert will be a solid member of a suitable foam-type synthetic plastic, of which many are available and of which the material which is commercially available under the trade name "Styropor" has been found to be particularly advantageous. "Styropor" is a trademark of Badische Anilin-und Soda Fabrik and designates an expandable polystyrene, as explained in the "Chemical Week" Buyer's Guide 1968. The plastic will preferably be slightly compressible and be capable of being readily worked with conventional tools, such as a lumber saw. To facilitate removal of the insert from the recess in the body of hardenable material those faces of the insert which will be eventually juxtaposed with the hardenable material will be covered with an adhesion-preventing means, for which purpose a web or foil of plastic material has been found to be particularly advantageous. Of course, instead of a foil it is also possible to encase the complete insert in a bag or envelope of such plastic material. This prevents adhesion of the hardenable material to the insert.

To achieve expelling of the insert from its recess there is provided in accordance with the present invention a conduit which communicates with a clearance existing between the juxtaposed inner face of the insert and the bottom wall of the recess. The other end of this conduit will extend outwardly beyond the wall structure so as to be accessible for the introduction of a pressure fluid thereinto. Since the material of the insert is elastically deformable to some extent, the introduction of such pressure fluid into this clearance between the bottom wall of the recess and the inner face of the insert causes pressure on the insert in a direction toward the open side of the recess. This pressure, in turn, causes a slight elastic deformation of the material of the insert such that it will engage the lateral walls of the recess so that escape of the pressure fluid is prevented. As the pressure builds up, the insert is expelled from the recess.

In a preferred embodiment of the invention I dispose a bag means in this clearance between the bottom wall of the recess and the inner face of the insert, and connect the conduit for communication with this bag means. The pressure fluid is then introduced into the bag means and, as the same expands, the insert is expelled from its recess. This is particularly advantageous in constructions in which the configuration of the recess makes it likely that introduction of the pressure fluid directly between the opposing surfaces of the bottom wall of the recess and of the inner face of the insert will not have the desired effect because the pressure fluid will be able to escape as a result of the particular configuration of recess and insert. Of course, the material from which the bag means or cushion is constructed must be elastomeric in its properties. On the other hand, it is possible to provide a construction in which two webs of plastic material are superposed and fluid-tightly joined along predetermined lines so that the innermost foil will perform the adhesion-preventing function. Portions of the foils may also extend downwardly over the lateral faces of the insert. These downwardly extending portions are then secured to the lateral faces, for example midway of the height of these faces, and to each other in an airtight manner so that the need for separate cushions and adhesion-preventing foils is eliminated. In this construction the material used for the cushion need not have elastomeric properties.

In yet a further embodiment of the invention it is possible to substitute for the cushion an elongated tubular member, for example a hose-like bag which, if desired, may be arranged in an undulating path or may inherently be given an undulating configuration.

A conduit is provided for introducing a pressure fluid either into the clearance mentioned above, or into whatever separate bag or cushion is provided. Such conduit will advantageously extend through the body of the insert itself and will communicate with, for example, the bag means. Such a construction obviates the need for preventing passages in the body of hardenable material itself. All connecting elements for connection of the conduit with the bag means may be embedded in the insert itself. On the other hand it is of course possible to have the conduit extend through the body of hardenable plastic material or even, if a bag means is not used and the pressure fluid is to be introduced between the opposing surfaces of insert and bottom wall of the recess, to simply push a separate conduit member having sharpened front edges through the material of the insert until it communicates with the clearance between the above-mentioned surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing which shows a somewhat schematic sectional elevation of an embodiment of the invention in which:

FIG. 1a shows an insert completely received in a recess;

FIG. 1b shows the insert in the process of being expelled by inflation of a bag means;

FIG. 1c is a view similar to FIG. 1a but showing a different bag means; and

FIG. 1d is a view which is also similar to FIG. 1a but showing still another bag means.

Discussing the drawing in detail it will be seen that there is shown a wall structure, such as a body of hardenable material 1 which is to be provided with a plurality of ribs or ridges 2 extending to one side thereof, thereby defining corresponding recesses intermediate adjacent ones of such ribs 2. Accordingly, suitably configurated inserts 3 of foam-type plastic material are positioned at the proper location in the wall structure, whereupon the hardenable material is molded about them. A foil or similar adhesion-preventing means 4 is placed at least about those surfaces of the insert which will subsequently be covered with the hardenable material 1, such as concrete. This foil facilitates later removal of the insert 3 inasmuch as it prevents adhesion of the concrete to the insert. In the illustrated embodiment an inflatable bag 5 of elastic material is interposed between the inner face of the insert and the foil 4, and a conduit 6 which in this embodiment is shown to extend through the body of the insert 3, communicates with this inflatable bag 5 which, it will be understood, will be fluid tight. Connecting members 7 for connecting the inner end of the conduit 6 with the inflatable bag are located within the body of the inset 3. The outer end of the conduit 6 is connected to a suitable source of pressure fluid, illustrated in the drawing schematically. It will be understood that any type of pressure fluid, be it pneumatic or hydraulic, is suitable.

In FIG. 1b there is shown how the introduction of pressure fluid from the source 8 through the conduit and into the bag 5 serves to inflate this bag whereby the insert is expelled from the recess. This is accomplished without any damage to the insert or to the bag so that both can be reused immediately upon their removal from the recess.

It will be understood that different sources of pressure fluid are suitable and such are so well known that a specific description is not believed to be necessary. It will be further understood that many different types of plastic material are suitable for the foils 4 and that, if for example an inflatable bag is used such as the bag 5 shown in the drawing, a plastic or other dispersion sprayed or otherwise applied to the surfaces of the insert 3 can be substituted for the foil.

FIG. 1c corresponds to FIG. 1a, except that a second foil 4a is juxtaposed with the foil 4 but extends only partly toward the open side of the recess. The foil 4a is fluid-tightly secured at its edge portions to the foil 4 and constitutes therewith the bag means.

FIG. 1d differs from FIG. 1c in that the bag means is constituted by an inflatable hose 5a or the like, which is arranged in an undulate manner between the insert 3 and the bottom wall of the recess.

It will be understood that each of the elements described above, or two or more together, may also find a useful application in other types of wall structures differing from the type described above.

While the invention has been illustrated and described as embodied in a wall structure, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a wall structure, in combination, a body of hardenable material, said body having a side provided with at least one recess which is bounded by an inner bottom surface portion and a plurality of side surface portions; an insert of foamed plastic material having elastomeric properties filling said recess in tight engagement with said side surface portions and having an outer surface portion adjacent said inner bottom surface portion; and expelling means for facilitating expulsion of said insert from said recess, said expelling means comprising adhesion-preventing means interposed between said surface portions of said recess and said insert, inflatable means located between said bottom and outer surface portions, and a conduit having a first end communicating with said inflatable means and an accesssible second end exteriorly of said recess, said insert being capable of undergoing slight elastic deformation as a result of said elastomeric properties thereof so as to yield on encountering frictional resistance to expulsion resulting from engagement with said side surface portions.

2. A combination as defined in claim 1, wherein said inflatable means is a bag means made from elastically deformable material.

3. A combination as defined in claim 1, wherein said adhesion-preventing means is a web of synthetic plastic material.

4. A combination as defined in claim 1, wherein said conduit comprises a tubular portion at least partially embedded in the material of said insert.

5. A combination as defined in claim 1, wherein said inflatable means is an elongated bag.

6. A combination as defined in claim 1, wherein said adhesion-preventing means is a web of plastic material; and wherein said expelling means further comprises an additional web of plastic material overlying and fluid-tightly secured to a portion of said first-mentioned web such as to form an inflatable bag means with the same, said first end of said conduit communicating with said bag means for enabling introduction of a pressure fluid thereinto.

7. A combination as defined in claim 6, wherein said insert has respective lateral faces extending at an angle to said outer surface portion thereof, wherein said first-mentioned web comprises portions overlying said lateral faces, and wherein said additional web comprises sections juxtaposed with said portions over at least part of the surface thereof and fluid-tightly secured thereto such that the resulting inflatable bag means extends over said outer surface portion and at least over portions of said lateral faces of said insert.

8. A combination as defined in claim 1, wherein said inflatable means is an undulating elongated bag.

References Cited

UNITED STATES PATENTS

| | | | |
|---|---|---|---|
| 1,444,709 | 2/1923 | Sea | 25—131 |
| 2,288,559 | 6/1942 | Ward | 52—127 |
| 2,341,700 | 2/1944 | Diack | 249—66 |
| 2,480,477 | 8/1949 | Jones | 249—66 |
| 2,850,785 | 9/1958 | Rushing | 249—66 |
| 2,967,467 | 1/1961 | Maude | 94—18.2 |
| 3,023,464 | 3/1962 | Zerbe | 52—127 |
| 3,061,904 | 11/1962 | Wise | 249—65 |
| 3,151,374 | 10/1964 | Kersten | 249—66 |

FRANK L. ABBOTT, *Primary Examiner.*

PRICE C. FAW, *Assistant Examiner.*

U.S. Cl. X.R.

25—120; 52—577; 249—66